(12) United States Patent
Cyrson

(10) Patent No.: US 6,558,542 B2
(45) Date of Patent: May 6, 2003

(54) WATER FILTER

(76) Inventor: John Cyrson, 7705 Coronet Road, Edmonton, AB (CA), T6E 4N7

( * ) Notice: Subject to any disclaimer, the term of this patent is extended or adjusted under 35 U.S.C. 154(b) by 0 days.

(21) Appl. No.: 10/064,794

(22) Filed: Aug. 16, 2002

(65) Prior Publication Data

US 2003/0034289 A1 Feb. 20, 2003

(51) Int. Cl.$^7$ .............. C02F 9/00; C02F 1/32; B01D 35/22; B01D 35/30; B01D 36/04
(52) U.S. Cl. .......... 210/232; 210/299; 210/209; 210/304; 210/307; 210/312; 210/259; 210/748.1
(58) Field of Search ................ 210/232, 299, 210/304, 307, 312, 202, 209, 259, 748.1

(56) References Cited

U.S. PATENT DOCUMENTS

| 5,190,651 A | * | 3/1993 | Spencer et al. |
| 6,036,853 A | * | 3/2000 | Spencer |
| 6,379,621 B1 | * | 4/2002 | Schwab |

* cited by examiner

Primary Examiner—Thomas M. Lithgow
(74) Attorney, Agent, or Firm—Bennett Jones LLP

(57) ABSTRACT

A water filter includes an egg-shaped housing formed from a lower shell and an upper shell. The lower shell is divided into an intake chamber and an outflow chamber. A filter or membrane is placed between the upper and lower shells.

5 Claims, 3 Drawing Sheets

WATER FILTER

CROSS REFERENCE TO RELATED APPLICATIONS

This application claims the priority benefit of Canadian Patent Application 2,355,444 filed Aug. 17, 2001.

BACKGROUND OF INVENTION

The present invention relates to water filters generally and an in-line domestic water filtering apparatus.

Domestic water supplies often contain impurities which affect the colour, taste or safety of drinking water. Therefore, there is a need in the art for effective and cost efficient water filter.

SUMMARY OF INVENTION

The present invention is directed to a water filter apparatus which has a lower intake chamber. Water which enters the apparatus is filtered upwards, such that impurities retained by the filter fall to the bottom of the intake chamber. The apparatus is preferably egg-shaped. The shape promotes a swirling action of water entering the intake chamber, which aids to clean the filter surface. Accordingly, in one aspect of the invention, the invention comprises a water filter apparatus comprising:

(a) a lower shell having an intake chamber and an outflow chamber divided by an internal divider, and a water intake leading to the intake chamber;

(b) an upper shell having an intake chamber and a outflow chamber divided by an internal divider, said internal divider defining an opening providing fluid communication between the intake and outflow chambers;

(c) a filter means disposed between the respective intake chambers of the lower and upper shells, such that water must pass through the filter to pass from the lower shell intake chamber to the upper shell intake chamber;

(d) wherein the lower shell and upper shell mate to form a substantially egg-shaped housing and the outflow chambers of each of the lower and upper shells form one main outflow chamber.

BRIEF DESCRIPTION OF DRAWINGS

The invention will now be described by way of an exemplary embodiment with reference to the accompanying simplified, diagrammatic, not-to-scale drawings. In the drawings.

DETAILED DESCRIPTION

Figure 1:
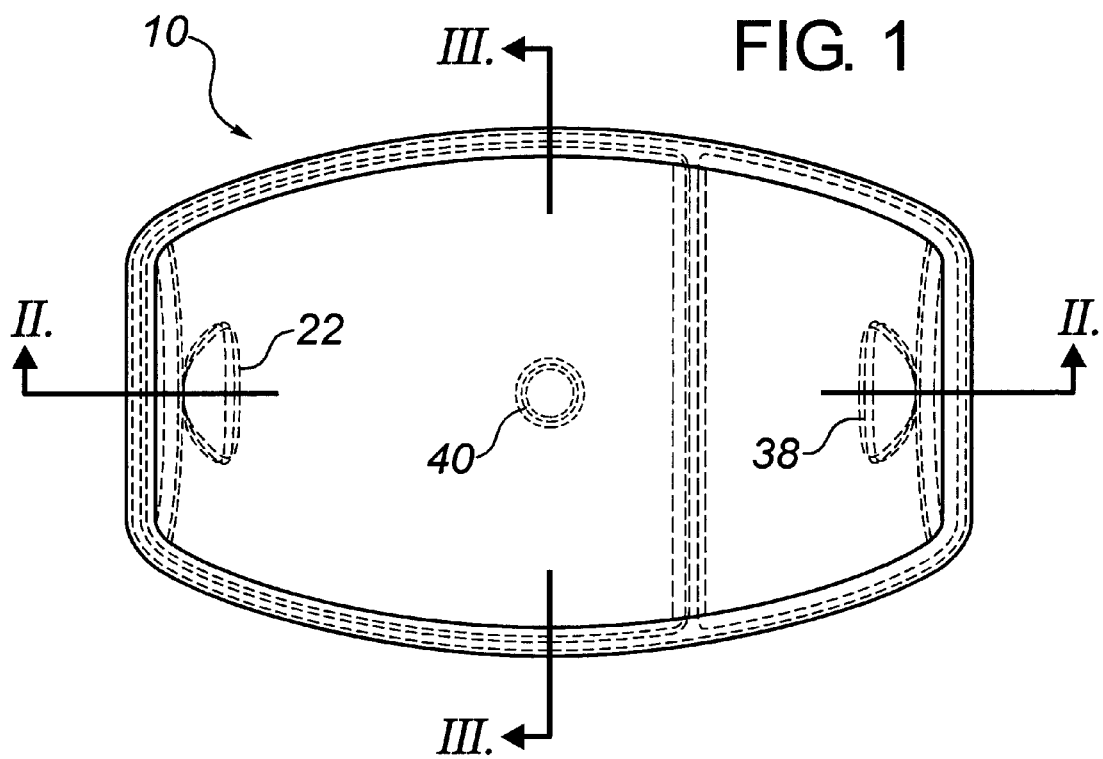
FIG. 1 is a top plan view of one embodiment the apparatus.

The present invention provides for a water filter. When describing the present invention, all terms not defined herein have their common art-recognized meanings.

The apparatus (10) according to the Figures comprises a water filter including a lower shell (12) and an upper shell (14). The lower shell is divided by an internal divider (16) into an intake chamber (18) and an outflow chamber (20). Water enters the intake chamber of the lower shell through intake valve (22) The upper shell is divided by an internal divider (24) into matching intake chamber (26) and outflow chamber (28). The upper divider defines an opening (30) which permits water to flow between the intake and outflow chambers.

Figure 4:
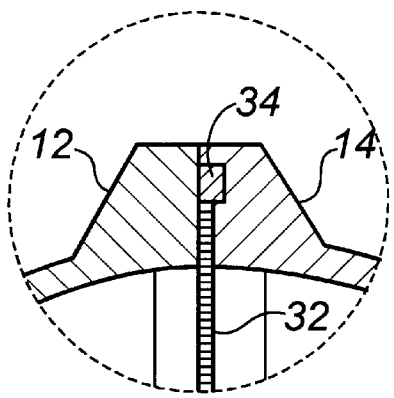
FIG. 4 is a detail of a portion of FIG. 3.
Figure 3:
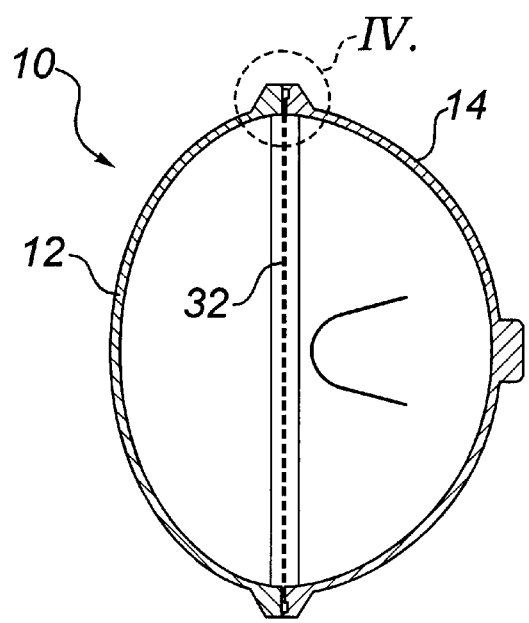
FIG. 3 is a cross-sectional view along line 3—3 in FIG. 1.
Figure 5:
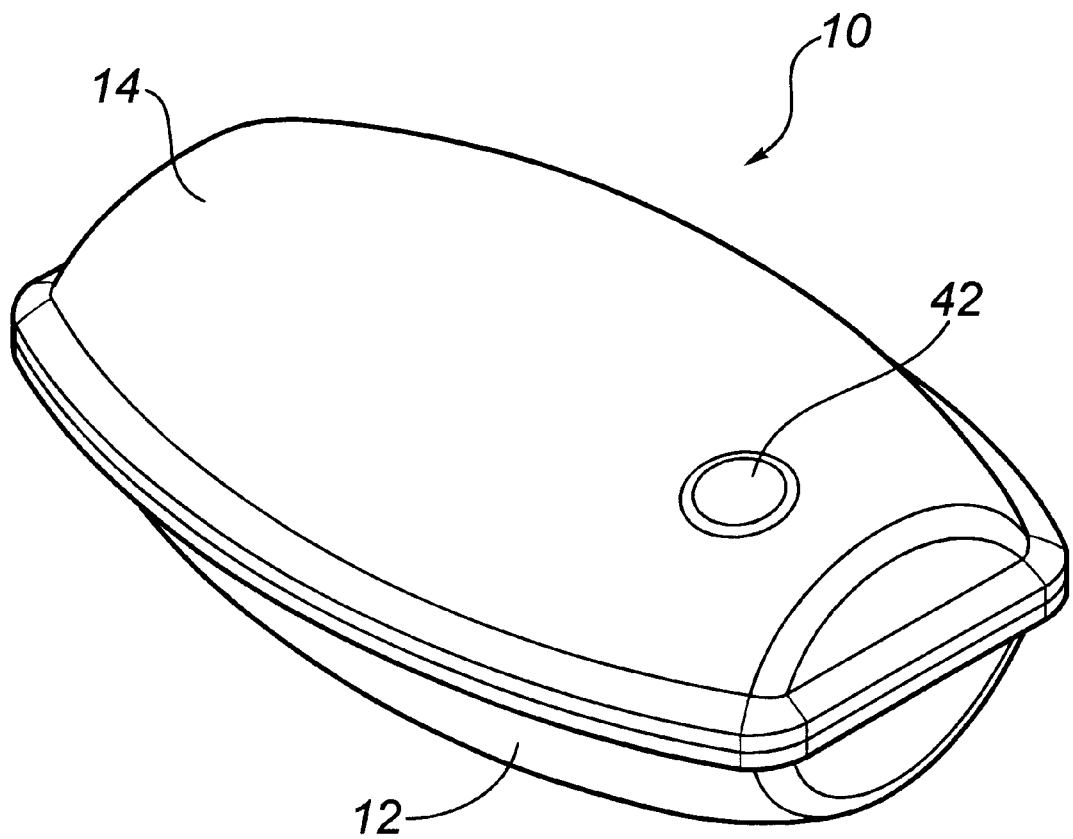
FIG. 5 is a perspective view of the apparatus.

A filter (32) is placed between the intake chambers of the upper and lower shells. The filter may be any suitable water filtering membrane or filter media. Preferably the filter is effective to prevent passage of unwanted water-borne impurities and does not easily clog. The filter is clamped between the upper and lower shells as is shown in FIG. 4. An O-ring gasket (34) provides a seal to prevent leakage.

In one embodiment, an activated charcoal filter (36) may be associated with the upper opening (30) to further treat the water passing through the apparatus.

In operation, water enters through the intake valve and fills the lower intake chamber. It then passes through the filter upwards into the upper intake chamber where it then passes through the optional activated charcoal filter into the outflow chamber. When the upper and lower shells are mated together, the two outflow chambers form one chamber and water exits through an outflow valve (38). In one embodiment, a germicidal ultraviolet light (42) may be provided. Preferably, the UV light is mounted in the upper shell (14) to illuminate the outflow chambers (20, 28).

Solids and other impurities retained by the filter settle to the bottom of the intake chamber and may be removed through solids removal port (40).

Figure 2:
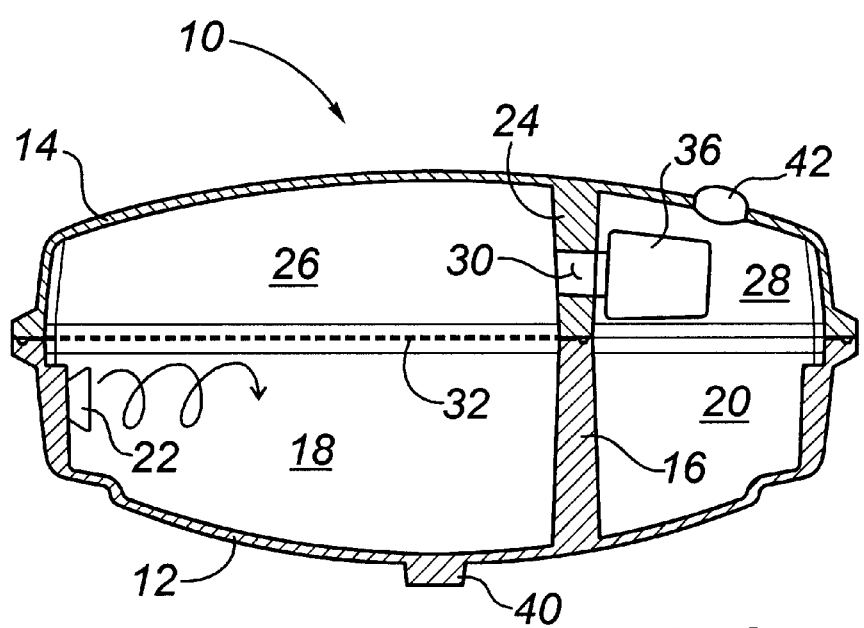
FIG. 2 is a cross-sectional view along line 2—2 in FIG. 1.
Figure 2A:
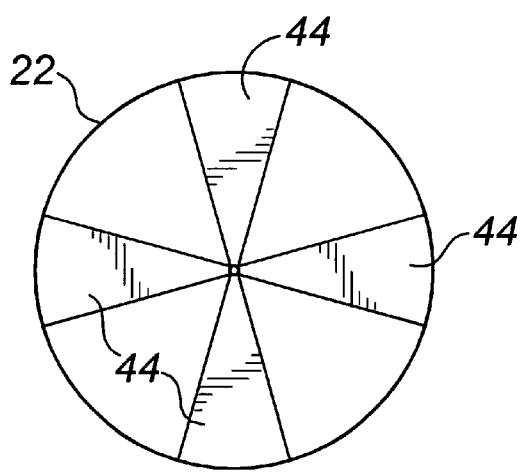
FIG. 2A is a detail showing a vortex creating intake valve.

The apparatus is substantially egg-shaped. In one embodiment, it is egg-shaped with truncated ends, as shown in the Figures. This design gives a very high strength. As well, the curved surfaces of the lower intake chamber promote a swirling action of water as it flows through the chamber. The swirling action assists in cleaning the filter, preventing clogging. In one embodiment, the intake valve (22) may be configured to input a vortex or spiral movement to the incoming water, as is shown in FIG. 2. The intake valve may have vanes (44) to deflect the incoming water stream.

It is intended that this apparatus be used inline in conventional water supply plumbing. The supply pressure forces water through the apparatus. However, those skilled in the art will recognize that the apparatus may be used to process batches of water if the intake water is sufficiently pressurized to move water through the apparatus.

As will be apparent to those skilled in the art, various modifications, adaptations and variations of the foregoing specific disclosure can be made without departing from the scope of the invention claimed herein.

What is claimed is:

1. A water filter apparatus comprising:

(a) a lower shell having an intake chamber and an outflow chamber divided by an internal divider, and a water intake leading to the intake chamber;

(b) an upper shell having an intake chamber and a outflow chamber divided by an internal divider, said internal divider defining an opening providing fluid communication between the intake and outflow chambers;

(c) a filter means disposed between the respective intake chambers of the lower and upper shells, such that water must pass through the filter to pass from the lower shell intake chamber to the upper shell intake chamber;

(d) wherein the lower shell and upper shell mate to form a substantially egg-shaped housing and the outflow chambers of each of the lower and upper shells form one main outflow chamber.

2. The apparatus of claim 1 further comprising activated charcoal filter means associated with the upper shell internal divider opening.

3. The apparatus of claim 1 further comprising a cleanout valve formed in the lower shell to remove solid impurities from the bottom of the lower shell intake chamber.

4. The apparatus of claim 1 further comprising means for creating a vortex in an incoming water stream.

5. The apparatus of claim 1 further comprising an ultraviolet light source.

\* \* \* \* \*